Figure 3:
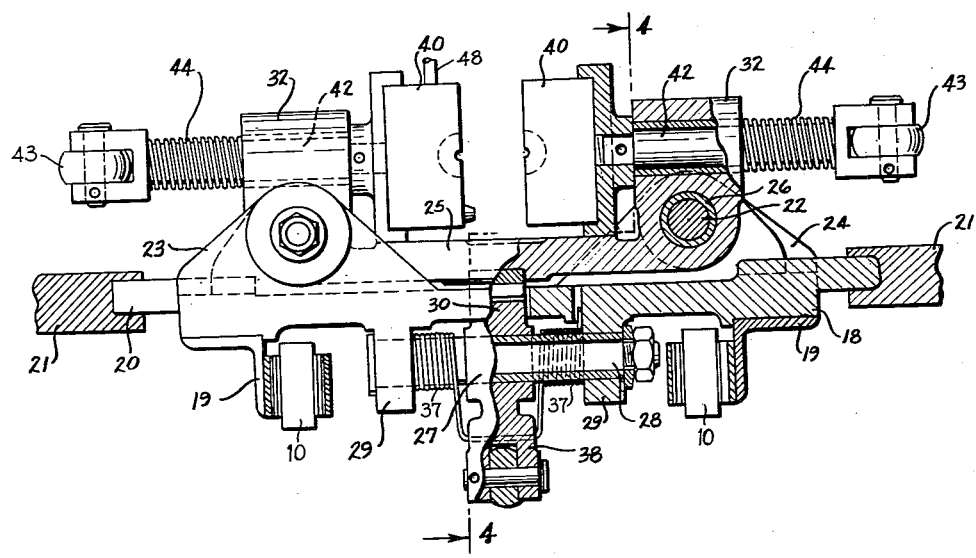

May 21, 1957  J. CARDOT ET AL  2,792,591
APPARATUS FOR FORMATION OF HOLLOW ARTICLES
Filed Feb. 1, 1954  2 Sheets-Sheet 1
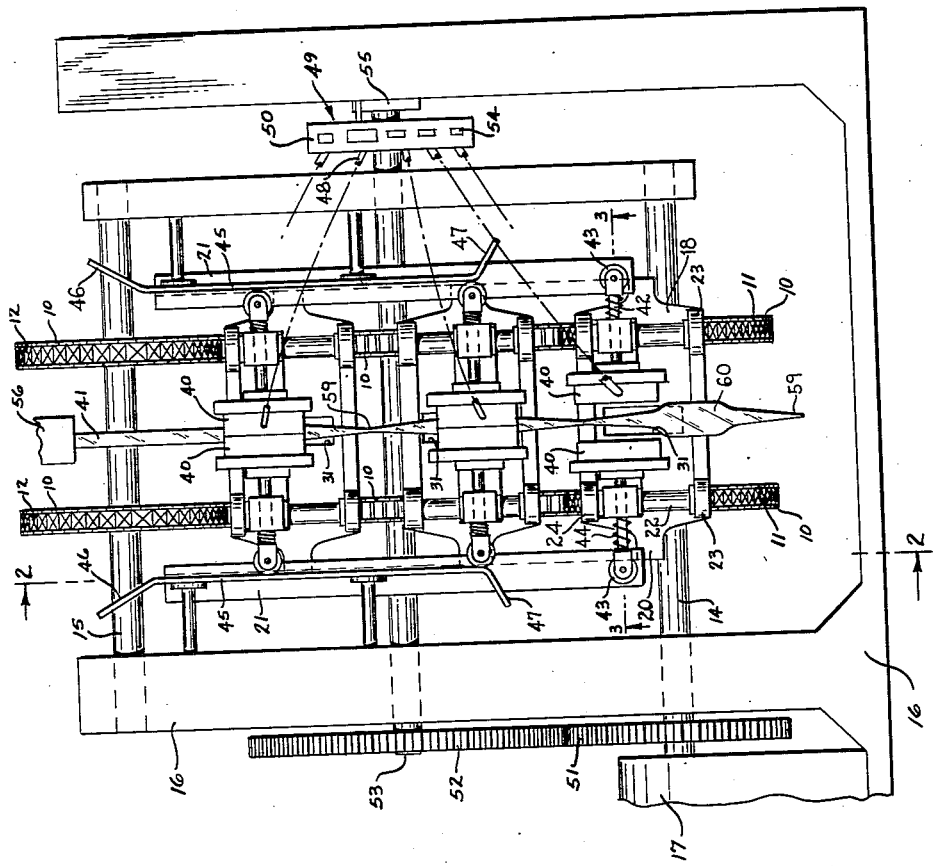
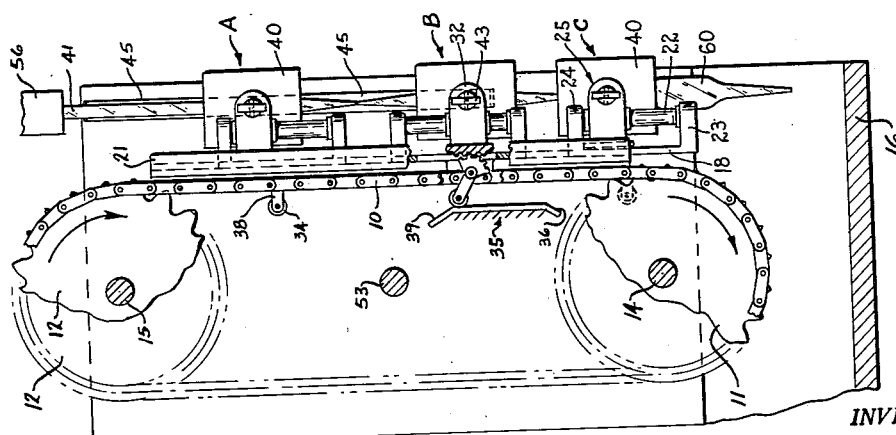
INVENTORS
JEAN CARDOT
JOSEPH LECORRE
BY
Bauer and Seymour
ATTORNEYS.

May 21, 1957  J. CARDOT ET AL  2,792,591
APPARATUS FOR FORMATION OF HOLLOW ARTICLES
Filed Feb. 1, 1954  2 Sheets-Sheet 2

INVENTORS
JEAN CARDOT
JOSEPH LeCORRE
BY
Bauer and Seymour
ATTORNEYS

United States Patent Office 2,792,591
Patented May 21, 1957

2,792,591

APPARATUS FOR FORMATION OF HOLLOW ARTICLES

Jean Cardot, Orleans, and Joseph Le Corre, Paris, France, assignors to Societe Anonyme des Manufactures des Glaces et Produits Chimiques de Saint-Gobain, Chauny & Cirey, Paris, France Application February 1, 1954, Serial No. 407,532

Claims priority, application France January 23, 1951

20 Claims. (Cl. 18—5)

This invention relates to automatic machinery and more particularly to apparatus which may be adapted to the manufacture of containers and like articles from a continuously moving supply of raw material, such as a hollow tube.

The present application is a continuation-in-part of our co-pending application Serial No. 267,273, filed January 19, 1952, for "Formation of Hollow Articles" and the invention herein disclosed may be employed in the manufacture of the types of hollow articles and in practicing the method disclosed in said co-pending application. The complete disclosure of said co-pending application is incorporated herein and made a part hereof by reference.

One of the objects of the present invention is to provide novel apparatus of the type adapted for use in converting selected lengths or sections of a hollow plastic tube into containers or other articles by a continuous process.

Another object of the invention is to provide apparatus of the above character which is simple in both construction and operation in comparison with prior known machines for similar purposes and which functions in accordance with an improved method to fabricate such articles or containers.

A further object is to provide a novelly constructed machine capable of fabricating a series of physically connected containers which may also be internally connected to permit the filling of a plurality thereof in a single operation.

Another object is to provide an improved machine which functions to produce hollow articles or containers of good and uniform quality at high speed and low cost.

The above and further objects and novel features of the present invention will more fully appear from the following detail description when the same is read in connection with the accompanying drawings. It is to be expressly understood, however, that the drawings are for purposes of illustration only and are not intended as a definition of the limits of the invention.

Figure 4:
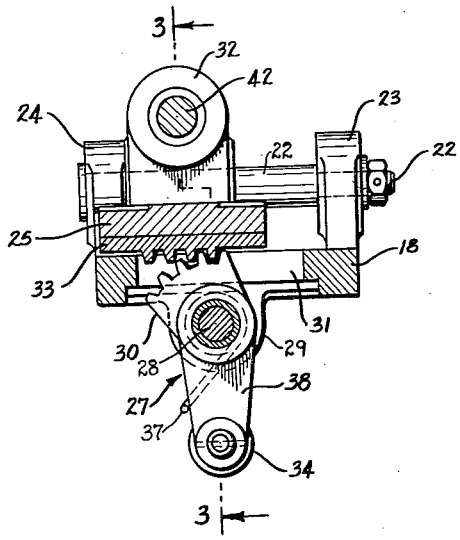

In the drawings, wherein like reference characters refer to like parts throughout the several views, Fig. 1 is a somewhat diagrammatic front elevation view, with some parts removed, of one form of machine embodying the present invention;

Fig. 2 is a somewhat diagrammatic side elevation view of said machine, with some parts shown in section and others omitted, the view being taken substantially on the line 2—2 of Fig. 1;

Fig. 3 is a detail view, partly in section and with parts broken away, of a mold and carriage assembly of said machine, the section being taken substantially on line 3—3 of Figs. 1 and 4; and Fig. 4 is a detail sectional view of the mold carriage and support therefor, taken substantially on line 4—4 of Fig. 3.

The single embodiment of the invention illustrated in the drawings, by way of example, is in the form of a machine adapted for the continuous production of small containers, such as ampules for pharmaceutical products or the like, said containers being made of such materials as glass, polyethylene, polyvinyl chloride or the like, which materials are plastic at elevated temperatures and then capable of being stretched, or molded, to desired shapes. In the form shown, such machine comprises an endless conveyor of the type consisting of two endless chains 10, 10 engaged with two pairs of sprockets 11 and 12 on shafts 14 and 15, respectively, which are mounted in a stationary frame 16. Shaft 14 is drivably connected to a suitable constant speed prime mover which may be an electric motor 17.

Mounted on conveyor chains 10, 10 at equal intervals and forming part of the conveyor means are a plurality of platforms or supports on each of which a sectional mold is supported in a novel manner for movement with and relative to said chains in a manner to be hereinafter more fully described. As illustrated, each of said supports comprises a plate 18 secured to chains 10, 10 in any suitable manner, such as by right angle brackets 19, 19 (Fig. 3). The ends of plates 18 are preferably reduced in width, as at 20, and are adapted during a major part of the descending movement thereof to engage and slide in grooves formed in stationary guide bars 21, 21 that are suitably mounted on frame 16.

Each platform or plate 18 has a rod 22 supported adjacent each end thereof in a pair of bosses or flanges 23 and 24. A mold carriage comprising a U-shaped bar 25 extends between and is slidably supported by rods 22 for reciprocating movement thereon between bosses 23 and 24. Rods 22 pass through bearing sleeves 26 on the inner or lower ends of bosses or arms 32 at the ends of bar 25. In the form shown, said reciprocating movement of carriage bar 25 is effected by a rocker arm 27 pivotally mounted on a shaft 28 supported in bosses 29 that project from the lower face of plate 18. One end of rocker 27 is a gear sector 30 and extends through a slot 31 in carriage plate 18, 20 into mesh with a rack 33 on carriage bar 25. The other end 38 of each rocker 27 is provided with a roller 34 which is adapted to engage a stationary cam bar 35 centrally positioned between the conveyor chains. During the descending movement of each support plate 18, the rocker 27 carried thereby first engages cam surface 39 at the upper end of bar 35, thereby pivoting rocker 27 clockwise, as viewed in Fig. 2, and effecting movement of carriage 25, 32 relative to and in the same direction as the conveyor. The carirage is shown in its advanced position between bosses 23 and 24 at station B near the center of Figs. 1 and 2. When roller 34 rides off of cam bar 35 along cam surface 36, rocker 27 and hence, carriages 25, 32 are returned gradually to their normal positions with respect to support plate 18, as seen at stations A and C in Figs. 1 and 2, by suitable resilient means, such as a coil spring 37. The latter is coiled around shaft 28 on opposite sides of rocker 27 and has its ends anchored in plate 18 with a central U-shaped portion thereof engaging arm 38 under tension.

A sectional mold is mounted on each carirage 25, 32 in a novel manner to be opened and closed in response to a novel manner by the conveyor means. In the illustrated embodiment, molds comprising two sections 40, 40 are shown. The detail construction of these molds is not, per se, a part of the present invention and is accordingly not shown. Speaking generally, each mold when closed provides for the passage therethrough of a tube 41 of material to be molded and forms a cavity conforming substantially to the shape of the product to be fabricated from sections of said tube. Exemplary mold forms are shown in the parent application mentioned above.

The mold sections 40, 40 are mounted on adjacent ends of push rods 42, 42 which are slidably supported by bearings in arms 32 of carriage 25, 32. The remote or outer ends of rods 42 are preferably bifurcated to receive rollers 43. The molds are normally held in opened position with the sections thereof separated (Fig. 3) by resilient means, such as compression springs 44. The latter are interposed between bosses 32 on the carriage and collars or shoulders on rods 42.

Closing movement of the mold sections is accomplished by cam means in response to the movement of the conveyor means. The cam means as shown comprises a stationary cam bar 45 (Fig. 1) mounted on the stationary frame at each side of the machine for engagement by rollers 43. As the supporting structure for each mold begins its descending movement, rollers 43 ride along the cam surfaces 46 at the upper ends of bars 45 to thereby positively move mold sections 40, 40 into engaging or closed position against the efforts of springs 44. The mold remains closed as it moves downwardly with the conveyor until roller 43 rides outwardly along cam surface 47 at the lower ends of cam bars 45. As said rollers move along surfaces 47, the springs 44 gradually separate mold sections 40 and the same remain open until rollers 43 are carried around again to engage cam surfaces 46.

Shortly after each mold 40, 40 is closed by cams 46, the cavity formed between the sections thereof is temporarily evacuated. This evacuation is effected by connecting the cavity to a source of vacuum (not shown) through a flexible tube 48 and a distributor valve 49 which may be of any suitable type known to the art. In the form shown, the distributor mechanism comprises a rotor 50 to which tubes 48 are connected at spaced intervals. The rotor is driven by motor 17 through pinions 51 and 52 and a shaft 53 at the same number of revolutions per minute as the conveyor chains, and the same is provided with spaced peripheral orifices 54 having valve shutters controlling the connections between the source of vacuum and tubes 48. Operation of said valve shutters is effected successively by the fixed cam 55 and in timed relation with the movement of the molds by the conveyor.

The tube 41 on which the above described apparatus operates in a novel manner to continuously produce ampules, bottles or similar containers from short lengths thereof may be fed from any suitable type of machine 56 shown diagrammatically in Figs. 1 and 2. The type of machine used will depend to some extent upon the material from which the tube is made. For example, some materials may be fed in a suitable plastic state from an extruder or similar machine by which the tube is initially formed. Other materials may be pre-formed into tubes and re-heated to a plastic state in machine 56. In either case, the tube 41 is fed between mold sections 40, 40 at a speed equal to the linear speed at which the molds are carried by the conveyor chains. With some thermoplastic materials it may be desirable to re-heat and hence soften the same between stations A and B to facilitate stretching of the tube 41 in the manner above described. This may be accomplished in a known manner with gas flames or other suitable means (not shown).

In operation, as each mold begins its downward travel, the ends of supporting plate 18, 20 therefor operatively engage the grooves in guide bars 21 and as rollers 43 ride inwardly and downwardly along the cam surfaces 46, the mold on said plate is moved to closed position around a downwardly moving section of plastic tube 41 without severing the latter. When the closed mold is in the vicinity of station A (Figs. 1 and 2), the cavity thereof is evacuated through the distributor mechanism 49, the proper valve being opened by fixed cam 55. By reason of this evacuation of the mold cavity, the section of tube 41 within the cavity is expanded by the atmospheric pressure internally thereof, causing said section of the tube to assume the shape of the mold cavity and thereby produce an ampule or other container 60 of desired shape. Before the rollers 43 reach cam surfaces 47 (station B) and hence, while the mold is still closed, roller 34 engages cam bar 35, 39, thereby causing the mold carriage 25, 32 and the mold to be advanced relative to their supporting or conveyor plate 18 and relative to the next succeeding mold which has then reached station A and in which tube 41 has then been expanded through the medium of evacuation of the mold cavity. Thus, the advance or forward movement of the mold shown at station B relative to the succeeding mold shown at station A effects a stretching and hence a double tapering reduction of the diameter of the section of tube 41 between the closed molds. This stretching action can be varied in amount to achieve different results, but it is preferably such as to reduce the internal diameter of tube 41 at its smallest transverse section 59 to a small tubular section without cutting off communication between successive ampules 60. Complete closure at point 59 can be effected by the stretching or by other suitable separate means if desired. It is advantageous in some cases to maintain communication between successive ampules or containers so that a plurality thereof may be filled in a single operation and closure effected when the same are separated.

Following the stretching operation, as the mold approaches station C, the rollers 43 ride off of cam bar 45 along cam surfaces 47, thereby permitting springs 44 to separate the mold sections 40, 40 in the manner above described, and thus free the tube 41 and the formed container 60 for continued downward movement. When the mold sections have been thus separated, further movement of the conveyor carries rollers 34 off of cam bar 35 along cam surfaces 36, thus permitting spring 37 to return carriage 25 and the open mold thereon to their normal position on conveyor plate 18, 20, i. e., adjacent bosses 24. The parts of each mold assembly then remain in said normal positions with the mold opened until the same are carried up the rear or upward reach of the conveyor chains. As each assembly starts its downward movement again, the above cycle is repeated. It will be understood that although only three-mold-carriage assemblies are illustrated in the drawings, corresponding equally spaced assemblies are carried by chains 10 throughout the entire length of the latter. Thus, the process will be continuous during movement of the conveyor and feeding of the tube 41.

There is thus provided novel apparatus whereby pharmaceutical ampules, bottles and similar containers may be fabricated at high speed and at relatively low cost, said apparatus being simple in both construction and operation, as well as rugged, to insure long and continuous periods of operation without interruption. Said apparatus is completely automatic, thereby obviating the necessity for skilled operating personnel, and the same may also be otherwise economically operated. The machine provided is also versatile in that it may be used to make a variety of products from a variety of materials by merely changing the molds 40, the sections of which may be readily detachably mounted on rods 42.

Although only a single embodiment of the invention is illustrated in the accompanying drawings by way of example, it will be expressly understood that the invention is not so limited. For example, in addition to the various modifications mentioned in the foregoing specifications, it will be clear that suitable strap or belt-type conveyor means could be employed in lieu of the chains and sprockets illustrated. If desired, the opening of the molds could be effected by the positive action of cam means, and the resilient means could be employed for closing the molds. Likewise, the actions of cam means 34, 35 and springs 37 in reciprocating carriages 25 relative to conveyor plates 18 could be similarly reversed if desired. Other variations, including changes in the design and arrangement of the parts illustrated, may lso be made without departing from the spirit and scope of the invention as the same will now be understood by those skilled in the art.

What is claimed is:

1. A machine for making ampules and other hollow articles or containers from a tube of material in a plastic state comprising an endless flexible conveyor, a series of spaced molds carried by the conveyor, each mold comprising two separate sections, means for slidably supporting said sections, means for controlling the movement of said sections to open and close the mold in timed relation to the movement of said conveyor, and means for controlling movement of said molds relative to the conveyor to vary the spacing between adjacent molds in the path along which the molds are moved by the conveyor and in timed relation to the movement of the conveyor.

2. A machine for making ampules and other hollow articles or containers from a tube of material in a plastic state comprising an endless conveyor, a series of spaced molds carried by the conveyor, each mold comprising two separate sections, means for slidably supporting said sections, and means for controlling the movement of said sections to open and close the molds in timed relation to the movement of said conveyor, said means for slidably supporting said sections comprising rods, support means for supporting said rods for movement longitudinally of the axes thereof and means for slidably supporting said support means for limited movement transversely of said axes and relative to said conveyor.

3. A machine as defined in claim 2 wherein said controlling means comprises cam means for cooperation with rollers on said rods.

4. A machine as defined in claim 3 wherein said controlling means comprise resilient means for actuating said sections in one direction of movement thereof.

5. A machine as defined in claim 4 wherein the cam means effects the mold closing movement of said sections and the resilient means effects the mold opening movement thereof.

6. A machine as defined in claim 2 wherein said support means is mounted on the conveyor for limited straight line reciprocating movement relative to the conveyor along a straight line portion of the path of its movement by the conveyor.

7. A machine as defined in claim 6 comprising means for reciprocating said support means in timed relation with the movement of the conveyor.

8. A machine as defined in claim 7 wherein said means for reciprocating comprises second cam means and a rocker operatively associated with said second cam means and said support means.

9. A machine as defined in claim 8 wherein said rocker comprises a toothed sector in mesh with a rack on said support means.

10. A machine as defined in claim 8 comprising resilient means for actuating said rocker in one direction, the same being actuated in the other direction by said second cam means.

11. A machine as defined in claim 1 comprising means for successively evacuating each of said molds, and means for controlling said evacuating means in timed relation with the movement of said conveyor.

12. A machine as defined in claim 11 wherein the means for controlling the evacuating means comprises rotatable distributor mechanism including a plurality of valves and cam means for successively actuating said valves.

13. In apparatus of the class described, endless flexible conveyor means, means for driving said conveyor means at a constant predetermined speed, a plurality of sectional molds mounted on said conveyor means for cyclical movement therewith in an endless path, an appreciable portion of said path being along a straight line means for closing each of said molds and maintaining the same closed during its movement along a predetermined straight line portion of said path, means for temporarily evacuating the cavity of each of said molds while the same is closed, means for moving each of said molds forward from its normal position on the conveyor means a predetermined distance along said straight line portion of said path with respect to the adjacent following mold while the same is closed, means for opening each of said molds and maintaining the same open during its movement along another predetermined portion of said path, and means for moving each of said molds back to its normal position on the conveyor means while the mold is open.

14. Apparatus as defined in claim 13 wherein the means for opening and closing said molds comprises cam means for actuating each of the mold sections in one direction and resilient means actuating each of said sections in the reverse direction.

15. Apparatus as defined in claim 13 wherein the means for moving each of the molds forward and back on the conveyor means comprises cam means for moving the mold in one direction and resilient means for moving the mold in the other direction.

16. In apparatus of class described, endless conveyor means, means for driving said conveyor means at a constant predetermined speed, a plurality of sectional molds mounted on said conveyor means for cyclical movement therewith in an endless path, means for feeding a tube, the walls of which are in a plastic state, between the sections of said molds, means for successively closing said molds around spaced sections of said tube at a predetermined position along said path without severing the tube, means for evacuating the cavity of each mold while the same is closed to permit expansion of said tube within said cavity, means for successively moving each of said molds forwardly from its normal position on said conveyor means and relative to the next succeeding mold while it and said succeeding mold are closed around expanded sections of said tube to thereby stretch the unexpanded section of said tube between it and said succeeding mold, means for successively opening said molds after said stretching operation to free the tube therefrom, and means for returning the opened molds to said normal positions of the latter on said conveyor means before the same reaches said predetermined position for reclosing.

17. In apparatus of the class described, a sectional mold, constant speed flexible conveyor means for moving the mold in an endless path, a portion of which is along a straight line, and means operable in response to movement of the conveyor means for closing and opening said mold and for moving said mold forward and backward along said path a predetermined distance relative to said conveyor means during movement of the mold along said straight line portion of said path.

18. Apparatus as defined in claim 17 wherein the means operable in response to movement of said conveyor means are so constructed that during each cycle of movement of the mold along said path, the mold is successively closed, moved forwardly relative to the conveyor means, opened, and moved backwardly relative to the conveyor means.

19. In apparatus of the class described, a sectional mold, constant speed flexible conveyor means for moving the mold in an endless path, a portion of which is along a straight line, and means operable in timed relation to the movement of the mold along said straight line portion of said path for successively closing said mold around an expansible tube, temporarily evacuating the cavity of said mold around said tube, advancing said mold a predetermined distance with respect to and in the direction of movement of said conveyor means and with respect to the trailing portion of said tube to stretch the latter, opening said mold and moving the sections of the mold said predetermined distance with respect to and in a direction opposite to the direction of movement of said conveyor means and tube.

20. In apparatus of the class described, a sectional mold, a constant speed flexible conveyor for moving the mold in an endless path, a portion of which is along a straight line, means for closing and opening said mold, and means for moving said mold forward and backward along said path a predetermined distance relative to said conveyor while the mold moves along said straight line portion of its path, each of said means being operable in response to the movement of the conveyor.

References Cited in the file of this patent

UNITED STATES PATENTS

| | | | |
|---|---|---|---|
| 1,959,428 | Hoge | May 22, | 1934 |
| 2,326,041 | Lavallee | Aug. 3, | 1943 |
| 2,357,702 | Teichmann | Sept. 5, | 1944 |
| 2,493,439 | Braund | Jan. 3, | 1950 |
| 2,515,093 | Mills | July 11, | 1950 |
| 2,579,399 | Ruekberg | Dec. 18, | 1951 |